Patented Aug. 1, 1933

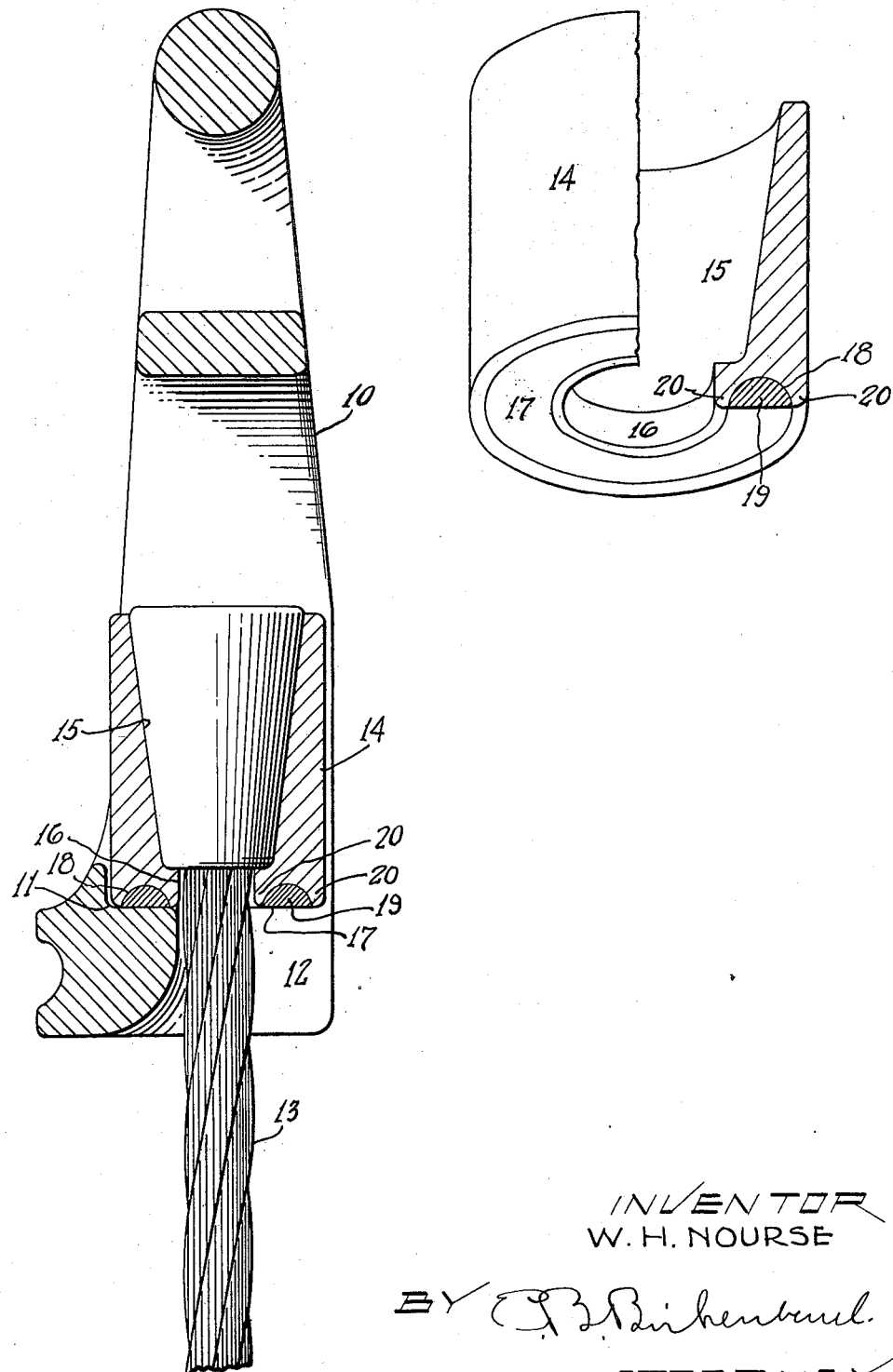

1,920,927

UNITED STATES PATENT OFFICE 1,920,927

FERRULE FOR CABLE ENDS AND METHOD OF FORMING SAME

Walter H. Nourse, Portland, Oreg., assignor to Electric Steel Foundry Company, Portland, Oreg.

Application March 21, 1931. Serial No. 524,398

1 Claim. (Cl. 24—123)

This invention relates generally to ferrules such as are employed on the ends of steel cables, and particularly to a special form of ferrule having a superior wearing face.

The main object of this invention is to construct a ferrule for cable ends of a material which has a hard wearing face and a sufficient strength and toughness for the purpose intended, at the same time being capable of undergoing marked changes in temperature for the purpose of making and removing the zinced ends without materially detracting from the strength of the material; and also permitting the ferrule to withstand shocks and impacts in freezing temperature, greatly reducing danger of breaking.

The second object is to provide a ferrule having the above qualifications with a wear-resisting face of self hardening metal which also serves to prevent the end of the ferrule from swelling under constant impacts, and at the same time using the relatively softer metal in the body of the ferrule to serve as a shroud which, in turn, supports the harder and more brittle wear-resisting metal.

The third object is to secure a saving of time and material by reducing the number of replacements of the ferrule itself and by preventing the sticking of the ferrule in the socket of the hook or other appliance to which it may be fastened. The clearances between the ferrule and the socket are necessarily small and the repeated hammering to which such devices are subjected causes the ordinary ferrule to stick in the socket, but the greatest saving is that of time of the entire logging crew which is ordinarily lost while waiting for a ferrule to be dislodged after it has become jammed in a socket.

These, and other objects, will become more apparent from the specification following, as illustrated in the accompanying drawing, in which:

Fig. 1 is a vertical section through a representative form of choker hook in connection with which this ferrule may be used.

Fig. 2 is a perspective view of the ferrule with a portion broken away in section.

Similar numbers of reference refer to similar parts throughout the views.

Referring in detail to the drawing, in order to illustrate this invention there is shown the ordinary form of choker hook 10 having formed therein a seat 11 and a slot 12. The slot 12 is of sufficient size to receive the cable 13 on whose end is secured a cylindrical ferrule 14 having a tapering recess 15 formed therein. At the small end of the recess 15 is an opening 16 through which the cable 13 can pass. It is well understood that the ends of the cable are then frayed or upset into the recess 15 and completely surrounded with socket metal or zinc.

It is highly important that the metal in the body of the ferrule be tough in order that it may withstand the terrific stresses placed on same, especially the action of shocks at low temperatures. By this construction the metal 20 around the base serves as a shroud to support the relatively brittle but hard metal 19.

It will be borne in mind that in order to remove a ferrule from a cable while in the woods, it is necessary to build a fire into which the ferrule end of the cable is inserted. This heating action is destructive to the properties of ferrule whose body is made of a material having suitable wearing qualities.

With the ferrule herein described the heat of the fire is not sufficient to appreciably injure the metal 20, which retains its hardness, or injure the body of the socket.

The ferrule which I am about to describe differs from ordinary ferrules inasmuch as its wearing face 17 is provided with an annular recess 18 into which is welded a very hard metal 19 of which numerous kinds are obtainable in the market in the form of a welding rod. This metal must have high resistance to wear and be capable of being heated to a temperature which will melt the zinc without appreciably affecting the Brinell hardness.

The cross section of the annular recess 18 may of course be varied without departing from the spirit of the invention.

What I declare as new and desire to protect by Letters Patent of the United States is:

A steel ferrule for cable ends comprising a cylindrical steel sleeve having a cable opening in one end thereof and an enlarged recess in the opposite end thereof communicating with said cable opening, the end of said sleeve having the cable opening therein having an annular recess around same on its wearing face and having a continuous ring of self hardening metal welded into said recess, said metal being of a character enabling same to withstand a temperature sufficient to melt zinc without affecting the Brinell hardness of the welding material.

WALTER H. NOURSE.